United States Patent
Taylor et al.

(10) Patent No.: US 7,194,805 B2
(45) Date of Patent: Mar. 27, 2007

(54) METHOD OF MANUFACTURING A POST BALL BEARING WITH HELICAL ARRANGEMENT OF POCKET HOLES

(75) Inventors: Brian Lee Taylor, Medina, OH (US); William Fred Heinze, Beaver Dam, WI (US)

(73) Assignee: Danly IEM, LLC, Cleveland, OH (US)

( * ) Notice: Subject to any disclaimer, the term of this patent is extended or adjusted under 35 U.S.C. 154(b) by 0 days.

(21) Appl. No.: 10/703,194

(22) Filed: Nov. 5, 2003

(65) Prior Publication Data

US 2005/0094904 A1   May 5, 2005

(51) Int. Cl.
*B21D 53/10* (2006.01)
*B21D 53/12* (2006.01)
*B21K 1/05* (2006.01)

(52) U.S. Cl. .............. 29/898.044; 29/898.064; 29/725; 72/98

(58) Field of Classification Search .......... 29/898.061, 29/898.062, 898.063, 898.064, 898.065, 29/898.066, 898.067, 898.07, 724, 725, 44, 29/898.044; 72/98
See application file for complete search history.

(56) References Cited

U.S. PATENT DOCUMENTS

| | | | | |
|---|---|---|---|---|
| 439,877 A | * | 11/1890 | Howard | .................. 384/451 |
| 463,833 A | * | 11/1891 | Howard | .................. 384/528 |
| 848,776 A | | 4/1907 | Sisson | |
| 1,330,158 A | | 2/1920 | Arnold | |
| 2,399,847 A | * | 5/1946 | Bauersfeld | .............. 384/569 |
| 2,997,778 A | | 8/1961 | Barkley | |
| 3,281,189 A | * | 10/1966 | Danneman | ................ 384/30 |
| 5,345,679 A | | 9/1994 | Lennon | |

FOREIGN PATENT DOCUMENTS

CH    218957 A    1/1942

OTHER PUBLICATIONS

European Search Report for European Application No. 04023801.6, dated Jan. 30, 2006.

* cited by examiner

*Primary Examiner*—David P. Bryant
*Assistant Examiner*—Sarang Afzali
(74) *Attorney, Agent, or Firm*—Schnader Harrison Segal & Lewis, LLP

(57) ABSTRACT

A post bearing and method of manufacture in which bearing balls are loaded into a series of pocket holes arranged along a helical pattern in a sleeve cage. A single groove is swaged into the outside diameter of the sleeve intermediate the ball turns to capture the balls in the pocket holes.

5 Claims, 3 Drawing Sheets

METHOD OF MANUFACTURING A POST BALL BEARING WITH HELICAL ARRANGEMENT OF POCKET HOLES

BACKGROUND OF THE INVENTION

This invention concerns post ball bearings of the type used for dies comprised of a cage sleeve having a distributed array of ball bearings, each captured in a through pocket hole in the sleeve wall. The balls are sized to protrude from both the inside and outside sleeve diameters when the sleeve is received over a shaft and confined within an outer sleeve.

The balls have conventionally been captured in the pocket holes by machining the holes to have a flange at the inside wall of the sleeve, and the area around each hole at the outer wall of the sleeve is swaged to reduce the hole diameter slightly after the ball is installed to allow the ball to rotate freely therein while preventing its escape.

This swaging has been accomplished in several ways, but typically requires that a separate swaging operation be performed on each hole, which is a slow and expensive process since large numbers of holes are required for each post bearing.

In one commercially available design, pairs of swaged indentations are formed around the sleeve located on either side of each of a series of annular rows of holes in the sleeve.

While somewhat simplifying the manufacturing steps, this method still requires extensive processing time due to the large number of separate swaging operations for each row of balls.

It is the object of the present invention to provide a post bearing of the type described and a method of manufacture which minimizes and simplifies the swaging operations required in securing the balls within the pocket holes in the sleeve cage.

SUMMARY OF THE INVENTION

The above objects and others which will become apparent upon a reading of the following specification and claims are achieved by a post bearing in which series of counterbored pocket holes are formed into the cage sleeve in a helical pattern, and the balls loaded into the holes. A rim formed at the inside of each hole prevents the balls from passing completely through the holes. The balls are captured by swaging a single spiral groove into the cage sleeve outside diameter lying in between each helical turn of the series of pocket holes, causing a slight displacement of the cage sleeve material adjacent the top of both sides of each pocket hole, preventing the escape of the balls.

The balls may be loaded by a dispenser having a loading tube coming into registry with each successive hole in the helix to allow loading of the balls just prior to swaging the groove in between the hole pattern turns to simplify the manufacturing steps required.

The balls may be retained by tape applied from a dispenser or a magnetic arbor holding the balls in the pockets until the swaging operation secures the same in the pocket hole.

DETAILED DESCRIPTION

Figure 1:
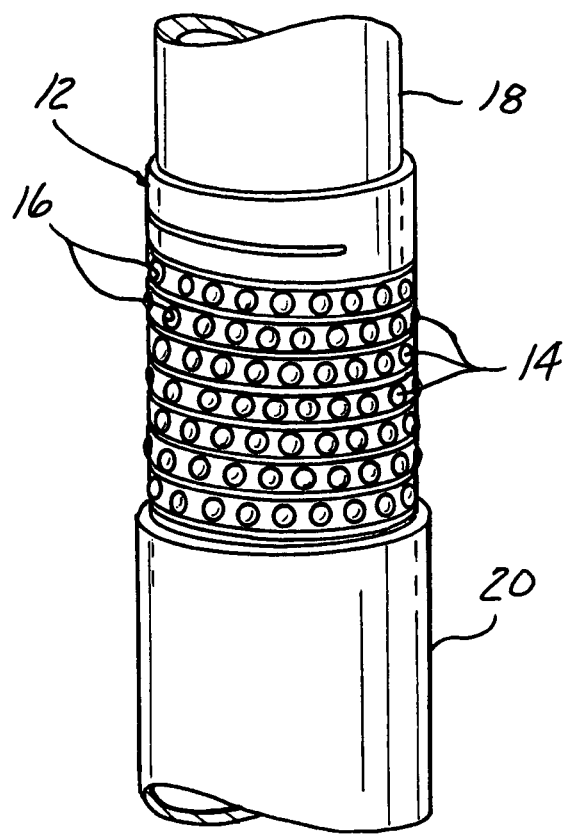
FIG. 1 is a perspective view of a post bearing according to the present invention, with portions of a mounting shaft and sleeve.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, a post bearing 10 is depicted which includes a sleeve cage 12 having a series of bearing balls 14 each protruding from one of a helical array of pocket holes 16. The post bearing 10 is received on a shaft 18 passing within the inside diameter of the sleeve cage 12, and an outer sleeve member 20 receives the outside diameter of the bearing 10. The balls 14 protrude from both the inside and outside diameter of the sleeve cage 12 and engage both the outer sleeve 20 and the shaft 18. The balls 14 are fit within the pocket holes 16 so as to be freely rotatable therein to create a rolling contact to provide for low friction linear motion between the shaft 18 and outer sleeve 20.

Figure 2:
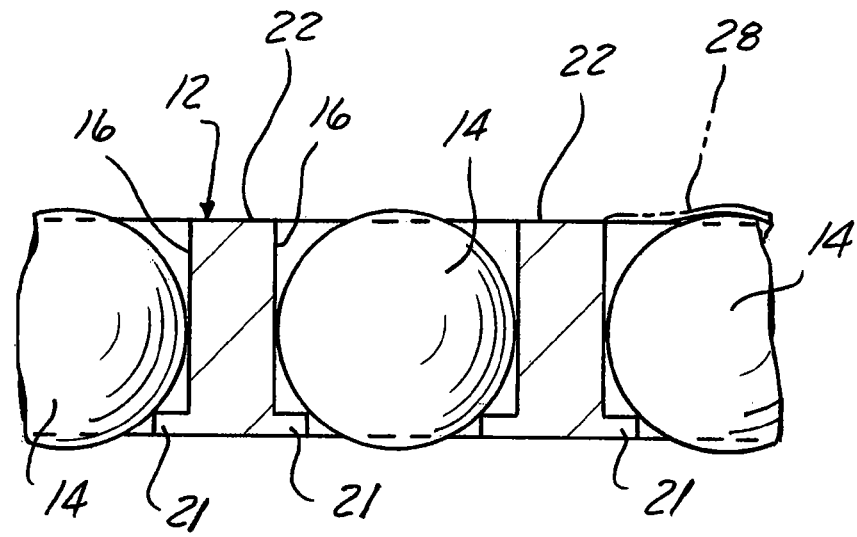
FIG. 2 is an enlarged partially sectional view of a fragmentary portion of the post bearing shown in FIG. 1, prior to swaging the outside diameter to capture the bearing balls.

FIG. 2 shows a segment of the cage sleeve 12 with a ball 14 deposited in each pocket hole 16. The holes 16 are machined into the side wall of the cage sleeve 12 with a counterbore producing a flange 21 at the inside end of each hole 16. Each flange 21 is sized to allow the associated ball 14 to protrude in past the inside diameter of the cage sleeve 12 to enable rolling contact to be established with the shaft 18.

The pocket holes 16 are arranged along the turns of a helical pattern about the axis of the cage sleeve 12 forming an intermediate band 22 between successive turns of the hole pattern.

Figure 3:
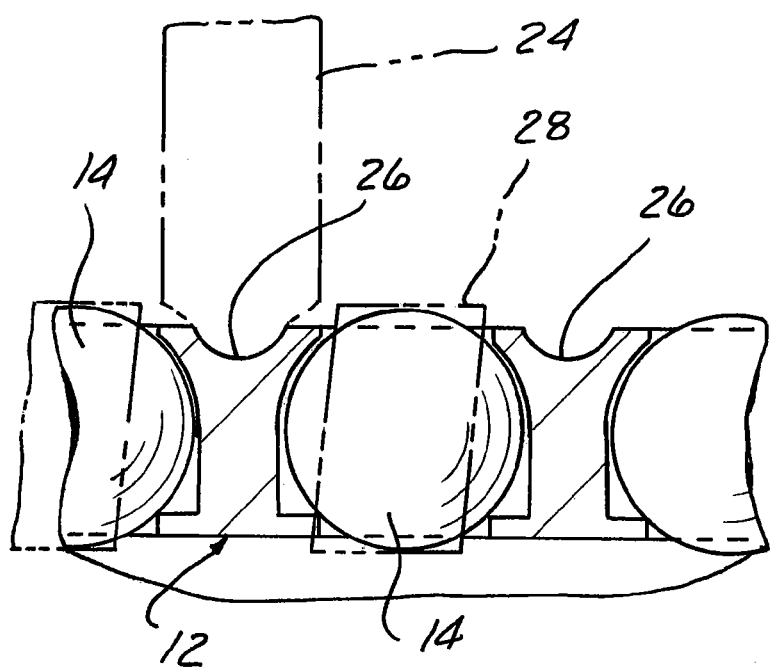
FIG. 3 is a view of the post bearing portion as shown in FIG. 2 with the swaging operation being performed by a swaging tool depicted in phantom lines, with a segment of a temporary tape retainer shown applied to some of the balls.

As seen in FIG. 3, a swaging tool 24 engages the intermediate band 22 to swage a shallow helical groove 26 into the outside diameter of the cage sleeve 12, forcing material of the cage sleeve 12 (normally of steel) to protrude over the outside end of the pocket holes 16, capturing the balls 14 in the pocket holes 16 while allowing the same to freely roll therein while protruding slightly out from the outside diameter of the cage sleeve 12. A temporary tape winding 28 can be applied to hold the balls 14 in place prior to swaging the groove 26.

Figure 4:
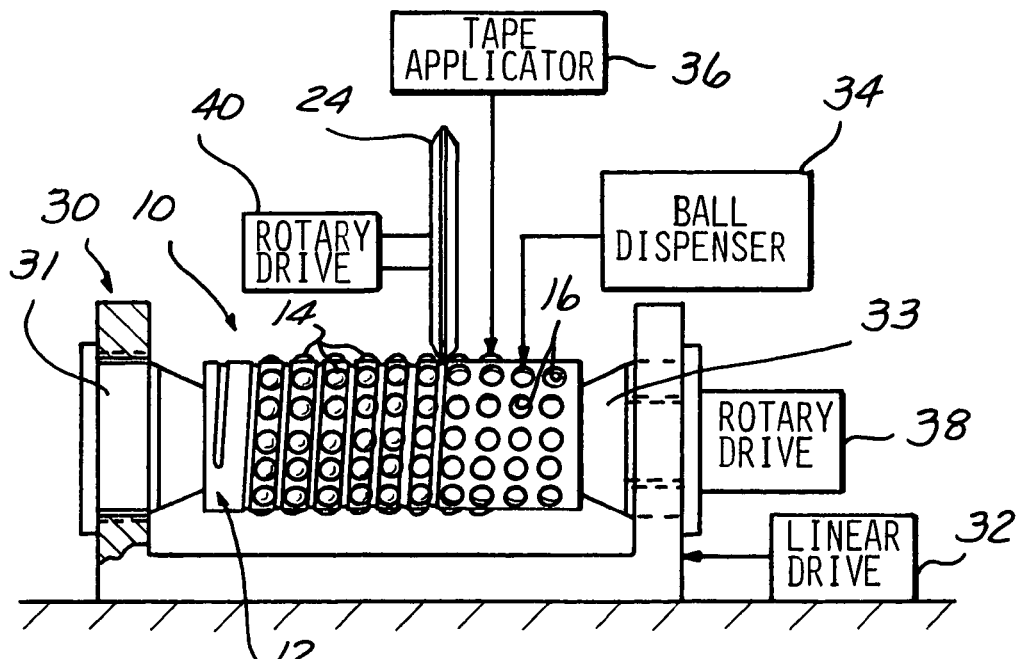
FIG. 4 is a diagrammatic depiction of the basic apparatus for carrying out the manufacturing method according to the present invention.

FIG. 4 is a diagrammatic representation of apparatus which can be used to manufacture the post bearing 10.

The helical series of pocket holes 16 are machined into the cage sleeve 12, which is thereafter chucked into a carriage 30 using separable tapered chucks 31, 33. A drive motor 38 for rotating the sleeve 12 is also operated as the carriage 30 is traversed by an actuator 32 past a ball loader/dispenser 34. A ball 14 is loaded by gravity into each hole 14 as the sleeve 12 is rotated and moved axially to present each hole 18 in succession beneath the ball loader/dispenser 34.

A tape applicator 36 applies a loop of tape 28 to temporarily retain the balls 14 in the pocket holes 16.

The swaging tool 34 driven by a rotary drive 40 then rolls a single groove 26 between the helical turns along which the balls 14 are arranged to permanently capture the same.

Thus, continuous loading and swaging steps are utilized to form each post bearing 10 to improve the efficiency of their manufacture.

Figure 5:
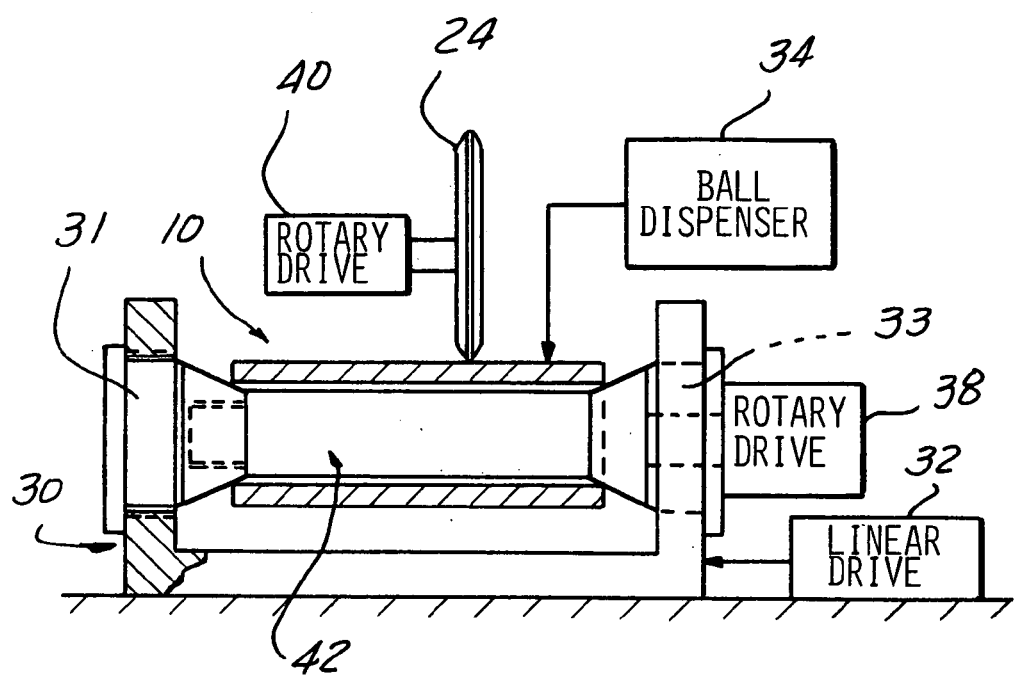
FIG. 5 is a diagrammatic depiction of an alternate apparatus of the basic apparatus for carrying out the manufacturing method according to the present invention.

FIG. 5 shows an alternative apparatus in which a magnetic arbor 42 is used to hold the balls 14 in the pockets 16 after being dispensed therein until the swaging operation is complete.

The invention claimed is:

1. A method of manufacturing a post bearing comprising:
    forming a series of pocket holes into a sleeve arranged in turns along a helical pattern on said sleeve, said pocket holes formed with a reduced size portion at the inside diameter of said sleeve;
        dispensing a ball into each pocket hole which is prevented from passing through said reduced size portion but allowed to protrude into said inside diameter;
    swaging a single continuous helical groove into an outside diameter of said sleeve intermediate said turns of said series of pocket holes to reduce the size of said pocket holes at the outside diameter of said sleeve to capture said balls in said pocket holes.

2. The method of claim 1 wherein in the step of dispensing a ball into each pocket hole, said sleeve is rotated and is moved axially to present each pocket hole successively beneath a ball dispenser/loader disposed above said sleeve.

3. The method of claim 2 wherein in said swaging step, a rotatable swaging tool is held in engagement with the outside diameter of said sleeve as said sleeve is rotated and moved axially past said swaging tool.

4. The method of claim 2 further including the step of winding tape around said sleeve so as to be in engagement with said balls after being loaded into said pocket holes to temporarily secure said balls therein.

5. The method of claim 2 further including the step of holding said sleeve on a magnetic arbor to hold the balls in said pocket holes until said swaging step is carried out.

* * * * *